United States Patent [19]
Graves et al.

[11] Patent Number: 6,086,174
[45] Date of Patent: Jul. 11, 2000

[54] APPLIANCE CABINET WITH REMOVABLE PANELS

[76] Inventors: William B. Graves; Molli E. Graves, both of P.O. Box 121, Bonner Springs, Kans. 66012

[21] Appl. No.: 09/009,972

[22] Filed: Jan. 21, 1998

[51] Int. Cl.[7] .................................................. A47B 47/00
[52] U.S. Cl. ........................ 312/263; 312/265.5; 312/406
[58] Field of Search ................................ 312/265.5, 265.6, 312/265.1, 265.2, 265.3, 265.4, 401, 406, 406.2, 263, 257.1; 361/724, 683; 220/4.02, 4.28

[56] References Cited

U.S. PATENT DOCUMENTS

| | | | |
|---|---|---|---|
| 1,508,917 | 9/1924 | Bullock | 312/265.5 |
| 1,560,922 | 11/1925 | Wege | 312/265.5 |
| 2,837,393 | 6/1958 | Sitler | 312/265.5 |
| 3,236,405 | 2/1966 | Reil | 312/265.5 X |
| 3,297,383 | 1/1967 | Fay | 312/265.4 |
| 3,313,674 | 4/1967 | Mathews . | |
| 3,347,609 | 10/1967 | Mann | 312/263 |
| 3,520,581 | 7/1970 | Borghi | 312/406 |
| 3,915,328 | 10/1975 | Hawes et al. . | |
| 3,984,223 | 10/1976 | Whistler, Jr. . | |
| 4,082,825 | 4/1978 | Puterbaugh | 312/406 X |
| 4,109,484 | 8/1978 | Cunningham . | |
| 4,332,429 | 6/1982 | Frick et al. . | |
| 4,602,827 | 7/1986 | Casanova . | |
| 4,771,908 | 9/1988 | McIntosh | 312/265.5 X |
| 4,870,735 | 10/1989 | Jahr, Jr. et al. . | |
| 4,896,785 | 1/1990 | Sodervall . | |
| 5,090,175 | 2/1992 | Arfert et al. . | |
| 5,360,263 | 11/1994 | Nakano et al. | 312/257.1 |
| 5,363,670 | 11/1994 | Bartilucci . | |

FOREIGN PATENT DOCUMENTS

| | | | |
|---|---|---|---|
| 2221127 | 4/1972 | Germany | 312/265.5 |

*Primary Examiner*—Janet M. Wilkens
*Attorney, Agent, or Firm*—Jeffrey L. Thompson; Thompson & Thompson, P.A.

[57] ABSTRACT

An appliance cabinet comprises an inner support frame having a plurality of panels releasably attached thereto for providing complete access to inner working components of the appliance needing maintenance or repair. Removable pre-painted colored panels having smooth inwardly molded edges cover the entire exterior of the appliance cabinet. Side panels include hem slots for receiving hemmed edges of a front panel, thereby interlocking side and front panels together. Similarly, side panels include tab slots for receiving tabs of a rear panel, thereby interlocking side and rear panels together. Side panels additionally include brackets which correspondingly overlap with threaded apertures in the rear panel for screwably securing side and rear panels to the support frame. The front panel also includes a plurality of fasteners which are releasably joined to the support frame. Individual panels can therefore be selectively removed without unnecessary removal of other panels. The removable panels may easily be substituted with panels of another color to conform to a changing interior decor.

17 Claims, 11 Drawing Sheets

APPLIANCE CABINET WITH REMOVABLE PANELS

BACKGROUND OF THE INVENTION

This invention relates to an appliance cabinet construction and, more particularly, to an appliance cabinet having removable exterior panels which provide convenient and complete access to working components.

It is known in the art of appliance repair that many appliances, including refrigerators and freezers, are difficult to repair because such appliances provide very limited access to the refrigerant coils, condensers, evaporators, and other internal components. Conventional refrigerators and freezers typically provide a small removable panel for the purpose of maintenance or repair. The small opening, however, provides inadequate access to components of the appliance or requires unnecessary removal of components to reach the desired part. As a result, many otherwise repairable appliances are disposed of, subjecting the consumer to the economic disadvantage of prematurely purchasing a new appliance. It is also well known that appliances often last for decades while interior decoration standards change much more frequently. Appliances are often unnecessarily disposed of merely because they clash with changed interior decoration.

Thus, it is desirable to have an appliance cabinet having interlocking removable panels which permit the interior components to be entirely exposed when maintenance or repair is necessary. It is also desirable to have an appliance cabinet construction having colored panels that are easily substituted to match the desired interior decor.

SUMMARY OF THE INVENTION

In response thereto, we have invented an appliance construction having removable panels about its sides, top, and bottom. The appliance construction utilizes a box-like support frame for housing the working components, such as evaporator and condenser coils and insulated storage liner in the case of a freezer or refrigerator. Each side panel includes brackets which correspondingly overlap with threaded apertures in a back panel, said side and back panels therefore being screwably securable to the frame support. The panels further include an interlocking structure for releasably securing the panels to each other. The perimeter edges of all panels are inwardly molded to eliminate any sharp edges. A top panel may be snappably secured to the lid or door of the appliance to maintain consistent decor. The removability of the panels thus provides full access to the working components of the appliance for maintenance and repair of the same as well as allowing decorative substitution of panels.

It is therefore a general object of this invention to provide an appliance construction having removable exterior panels for providing convenient and complete access to all components of the appliance requiring repair or replacement.

Another object of this invention is to provide an appliance construction, as aforesaid, having exterior panels that may be removed and replaced with panels of various colors.

Still another object of this invention is to provide an appliance construction, as aforesaid, having an interlocking connective structure for securing the panels to each other with no additional hardware.

A further object of this invention is to provide an appliance construction, as aforesaid, having removable panels about the entire appliance exterior, each panel having interiorly molded edges which eliminate sharp edges of interconnectivity.

A particular object of this invention is to provide an appliance construction, as aforesaid, having individually interlocking panels that can be individually removed without removing other panels.

Another particular object of this invention is to provide an appliance construction, as aforesaid, having panels which, in various combinations, can accommodate appliances of various dimensions.

Still another object of this invention is to provide an appliance construction, as aforesaid, that is both inexpensive to manufacture and provides consumer savings by extending the useful life of the appliance.

Other objects and advantages of this invention will become apparent from the following description taken in connection with the accompanying drawings, wherein is set forth by way of illustration and example, an embodiment of this invention.

DESCRIPTION OF THE PREFERRED EMBODIMENT

Figure 1:
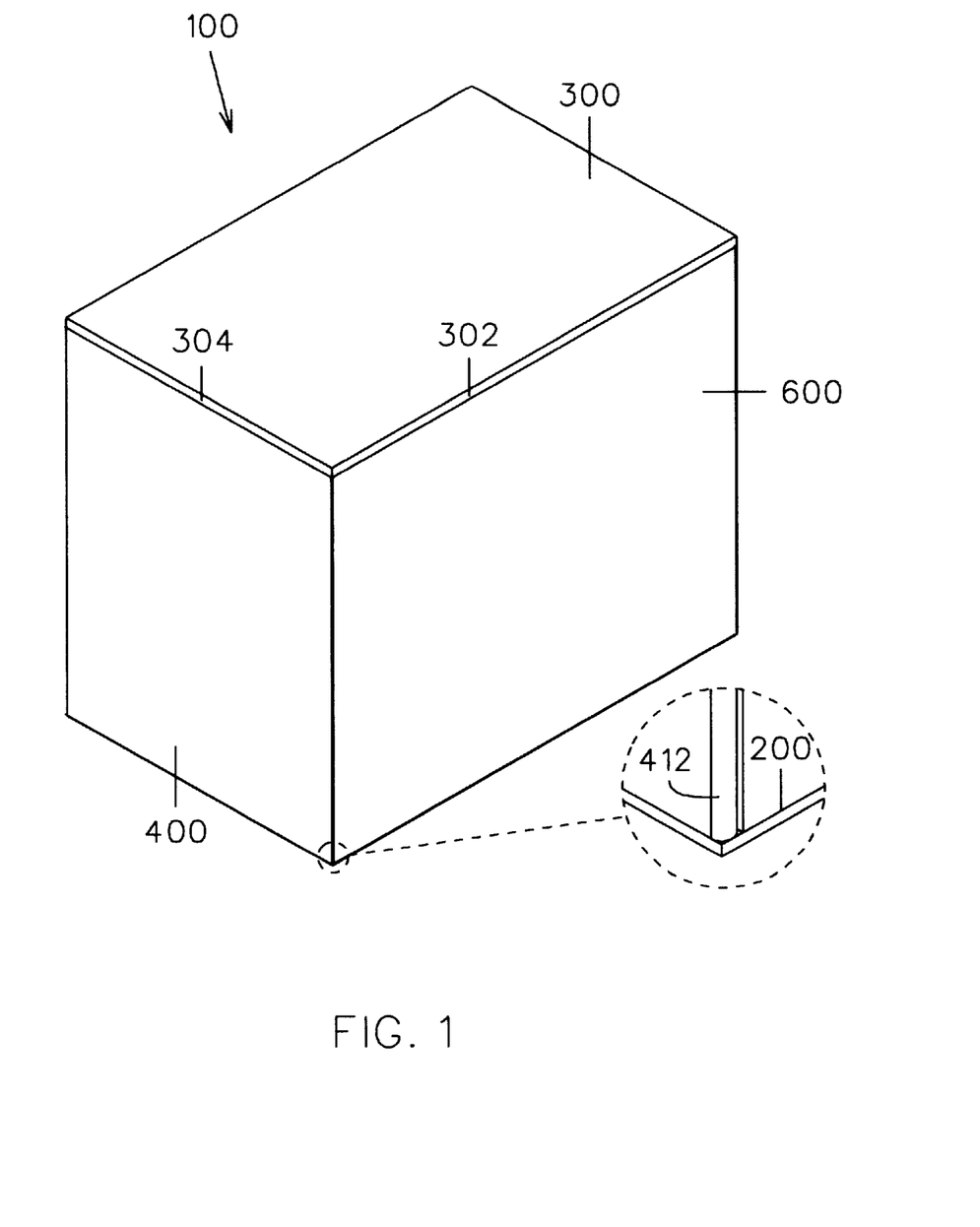
FIG. 1 is an isometric view of the invention showing in an isolated view the juncture of front, side, and bottom panels.
Figure 2:
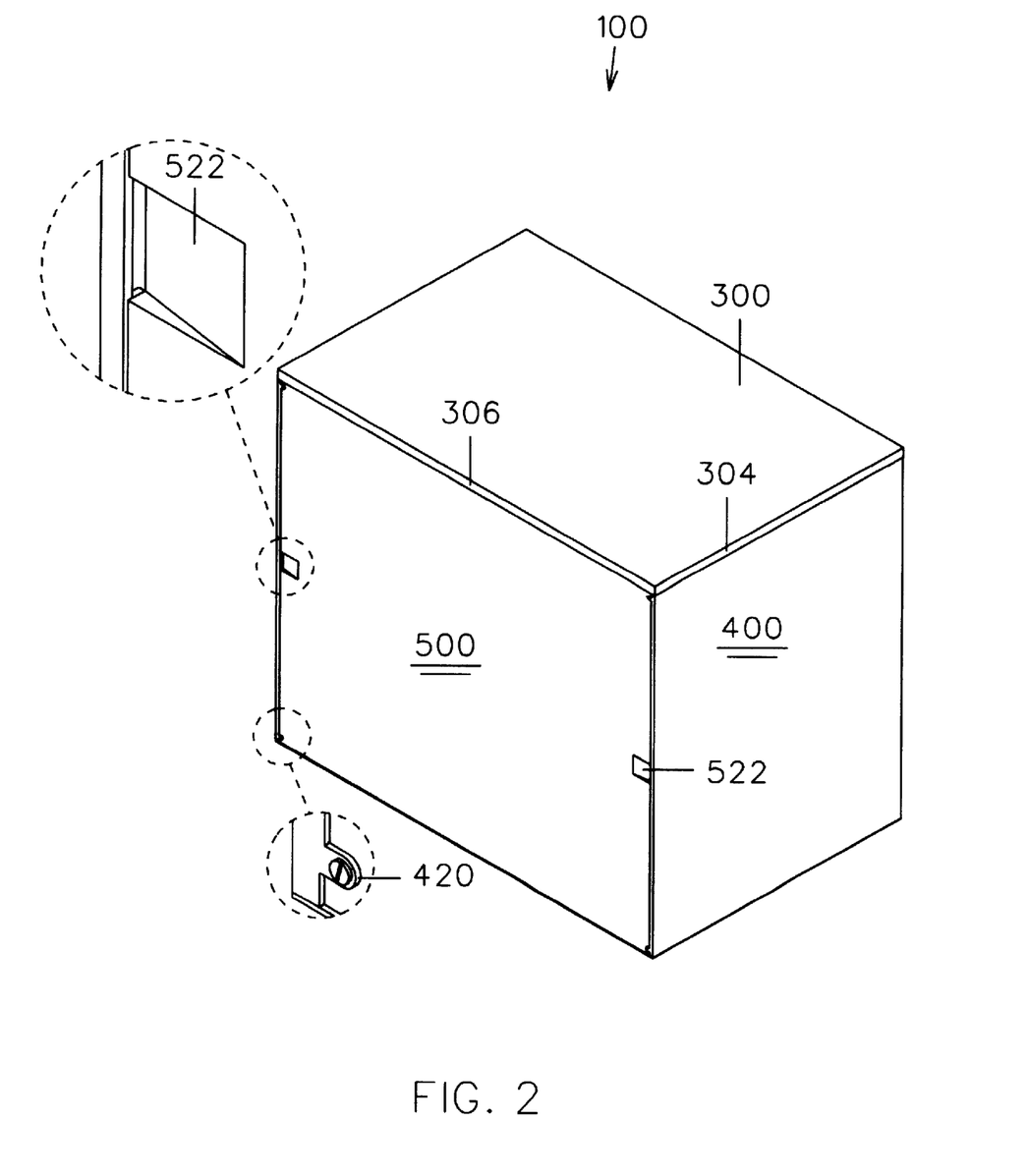
FIG. 2 is an isometric view of the invention with enlarged isolated views of a back panel recess, handle, and connecting bracket.
Figure 3:
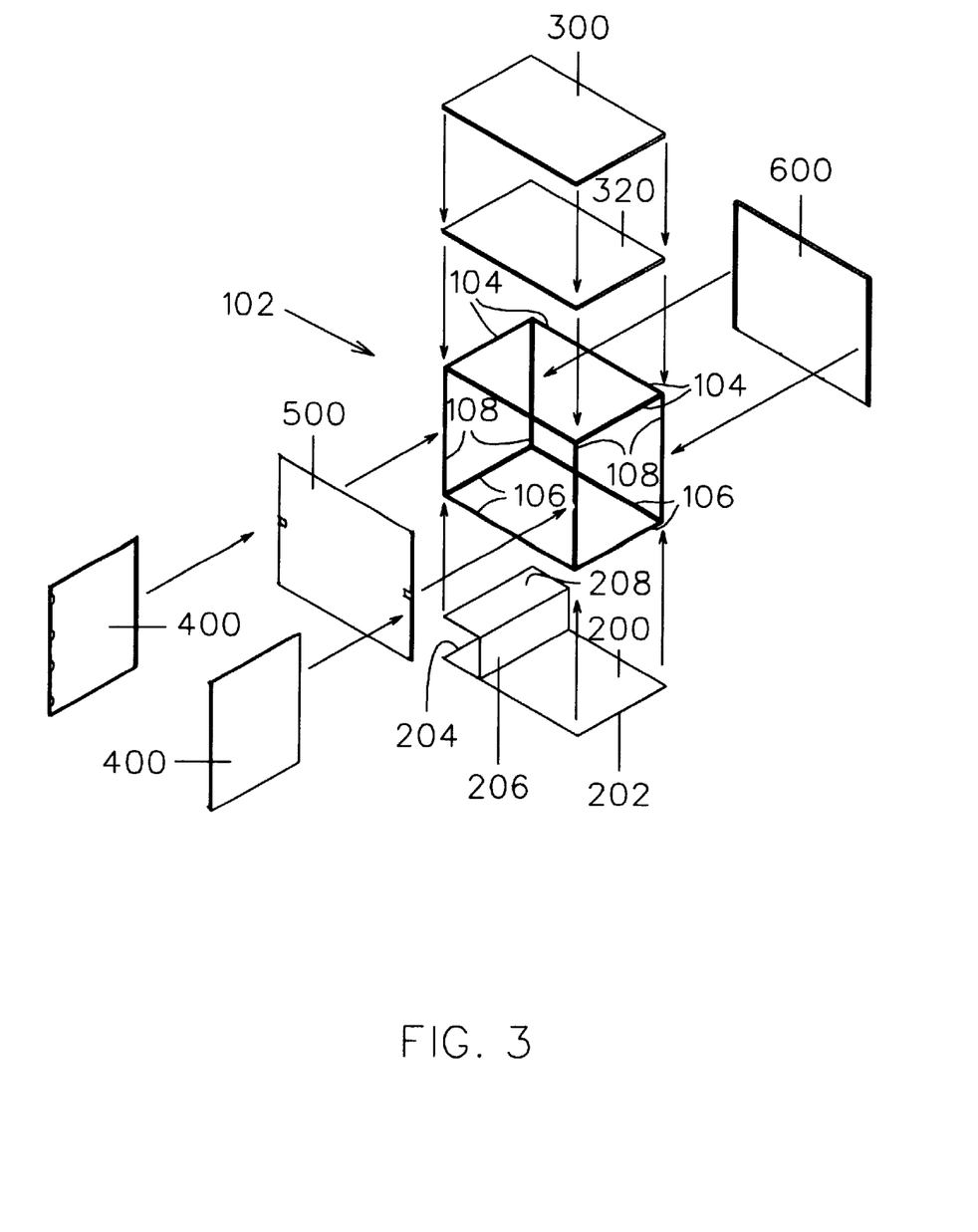
FIG. 3 is an exploded isometric view of the invention shown in FIG. 2 on a reduced scale.

Turning more particularly to the drawings, FIGS. 1–3 show the now preferred embodiment of the appliance cabinet construction 100 in a form well-suited for a chest-type freezer; it is understood, however, that this invention is not constrained to any particular type of appliance. The freezer cabinet 100 shown in FIG. 3 comprises a support frame 102 surrounded by a plurality of panels, each panel to be further described below. The panels are preferably made of a rigid plastic or an insulation material or thin pre-painted sheet metal. The support frame 102 comprises upper 104 and lower 106 beams in parallel horizontal planes having vertical posts 108 intermediate said upper and lower beams 104, 106 and joined thereto to form a generally rectangular box-like frame. Alternatively, the support frame 102 may be an enclosed insulated compartment to which the panels are attached as to be described.

Figure 10:
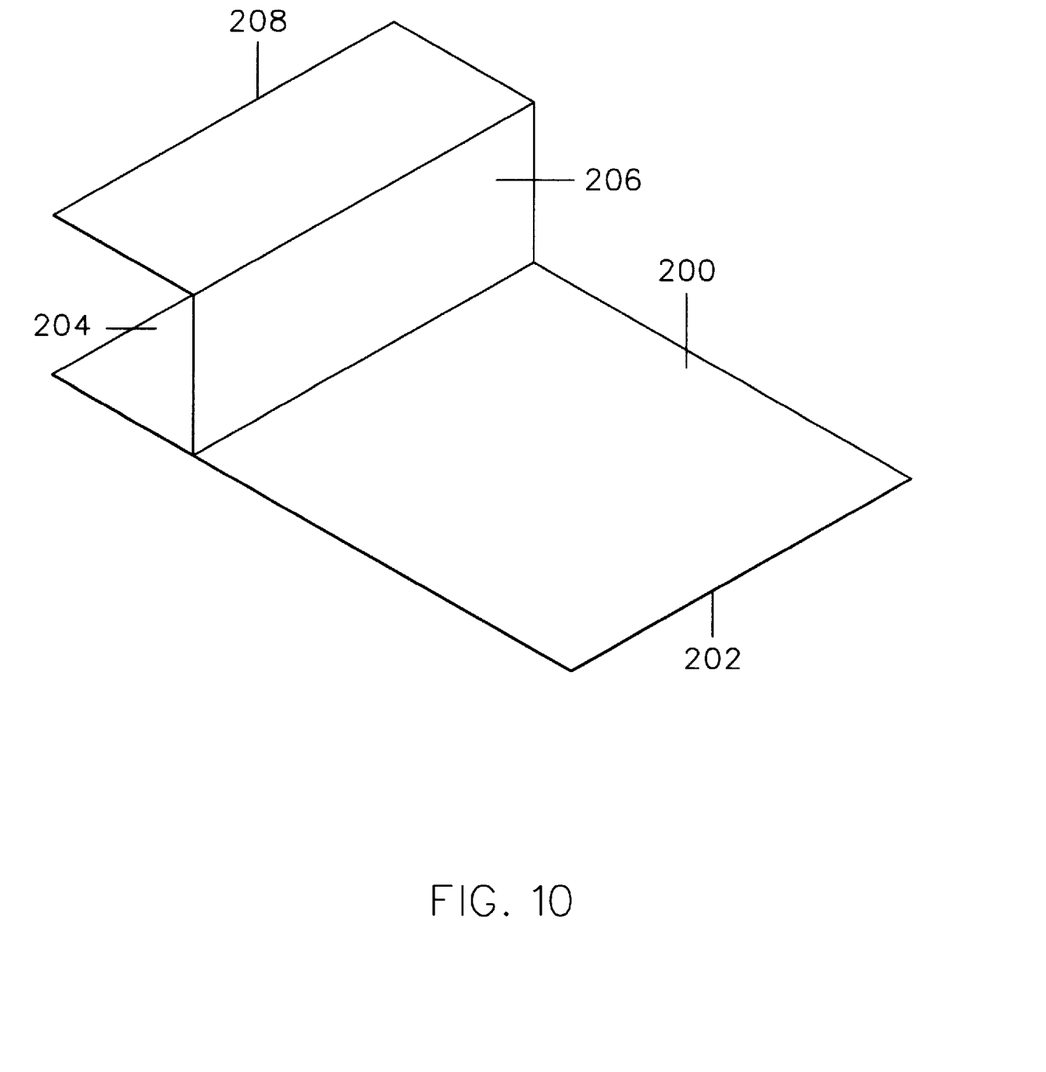
FIG. 10 is an isometric view of the bottom panel.
Figure 11:
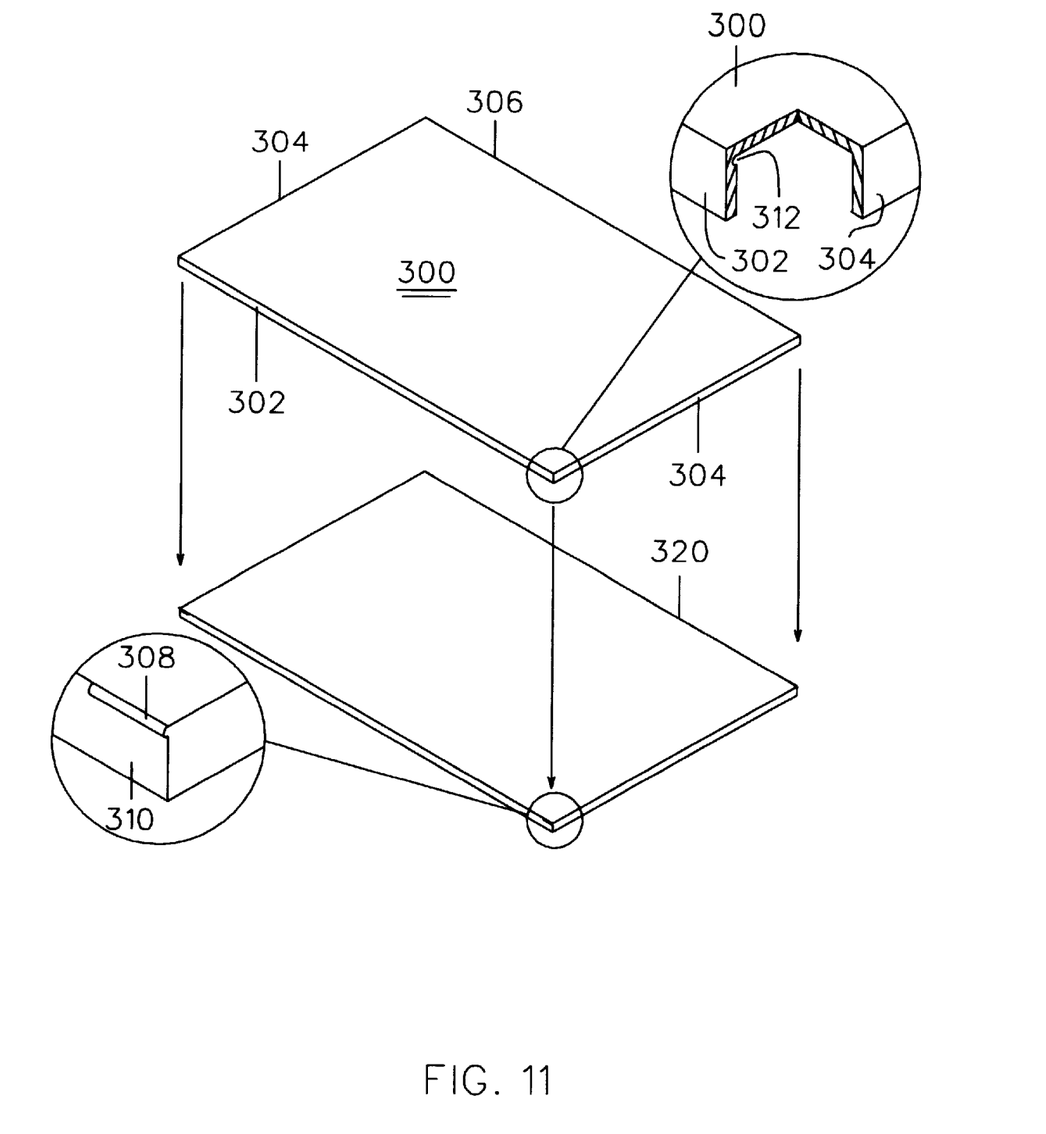
FIG. 11 is an isometric view of the top panel and appliance lid.

A bottom panel 200 having first 202 and second 204 ends is releasably mounted to the lower beams 106 of the support frame 102 by fasteners or the like, said bottom panel 200 having a vertical wall 206 displaced from the second end 204 of said bottom panel 200. The vertical wall 206 is integrally attached to a horizontal wall 208 extending parallel to the bottom panel 200 in the direction of second end 204 (see FIG. 10). The vertical 206 and horizontal 208 walls function to house the working components of the appliance. As shown in FIG. 11, a top panel 300 is removably joined to an appliance lid 320. The top panel 300 includes downwardly extending front 302, side 304 and rear 306 walls that surround said lid 320. A pair of flanges 308 are fixedly attached to a front edge 310 of the lid 320 and are snappably securable in corresponding notches 312 interiorly disposed in the front wall 302 of the top panel 300.

Figure 6:
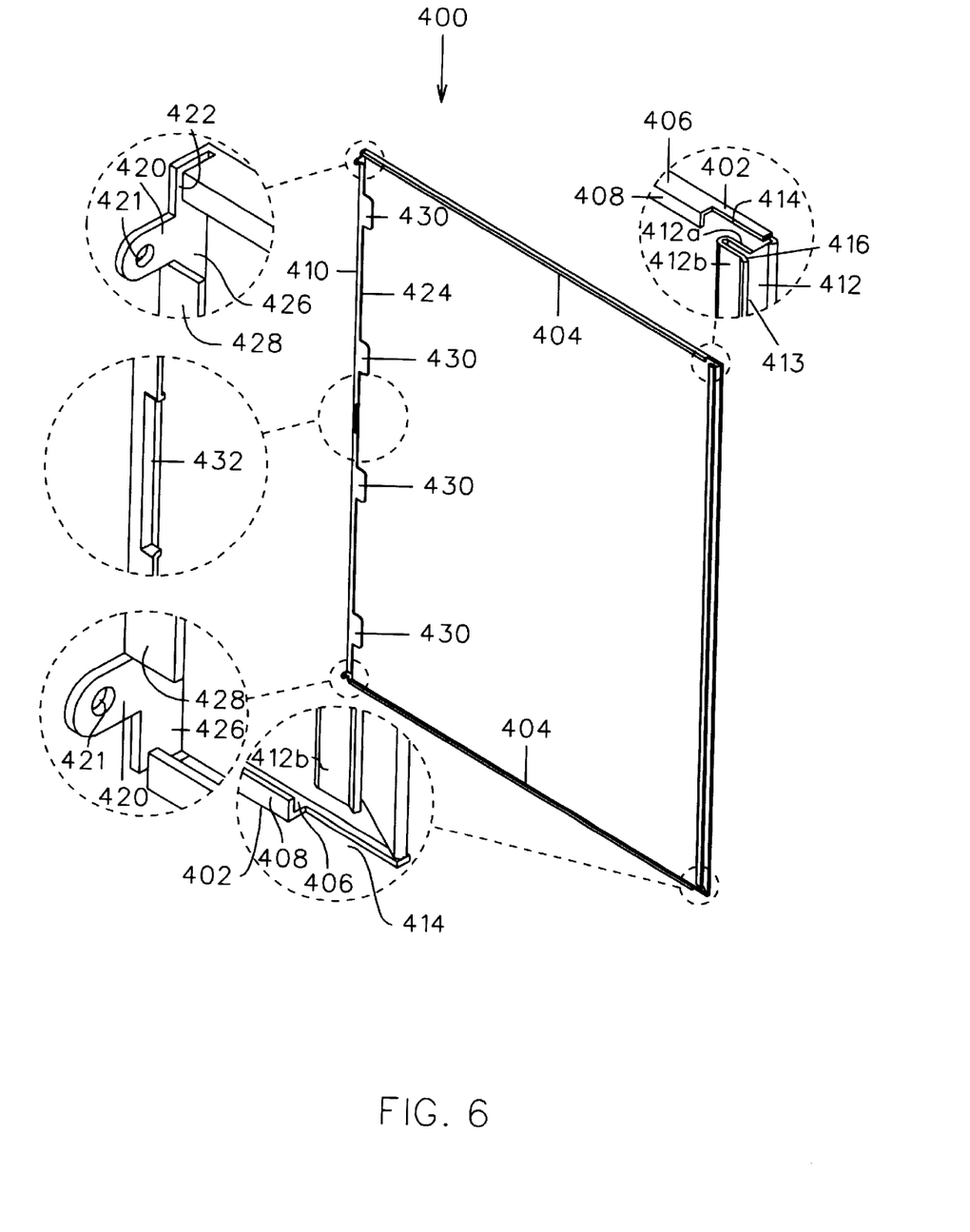
FIG. 6 is an isometric view of a side panel with enlarged isolated views of brackets, recess, and hem slot.
Figure 7:
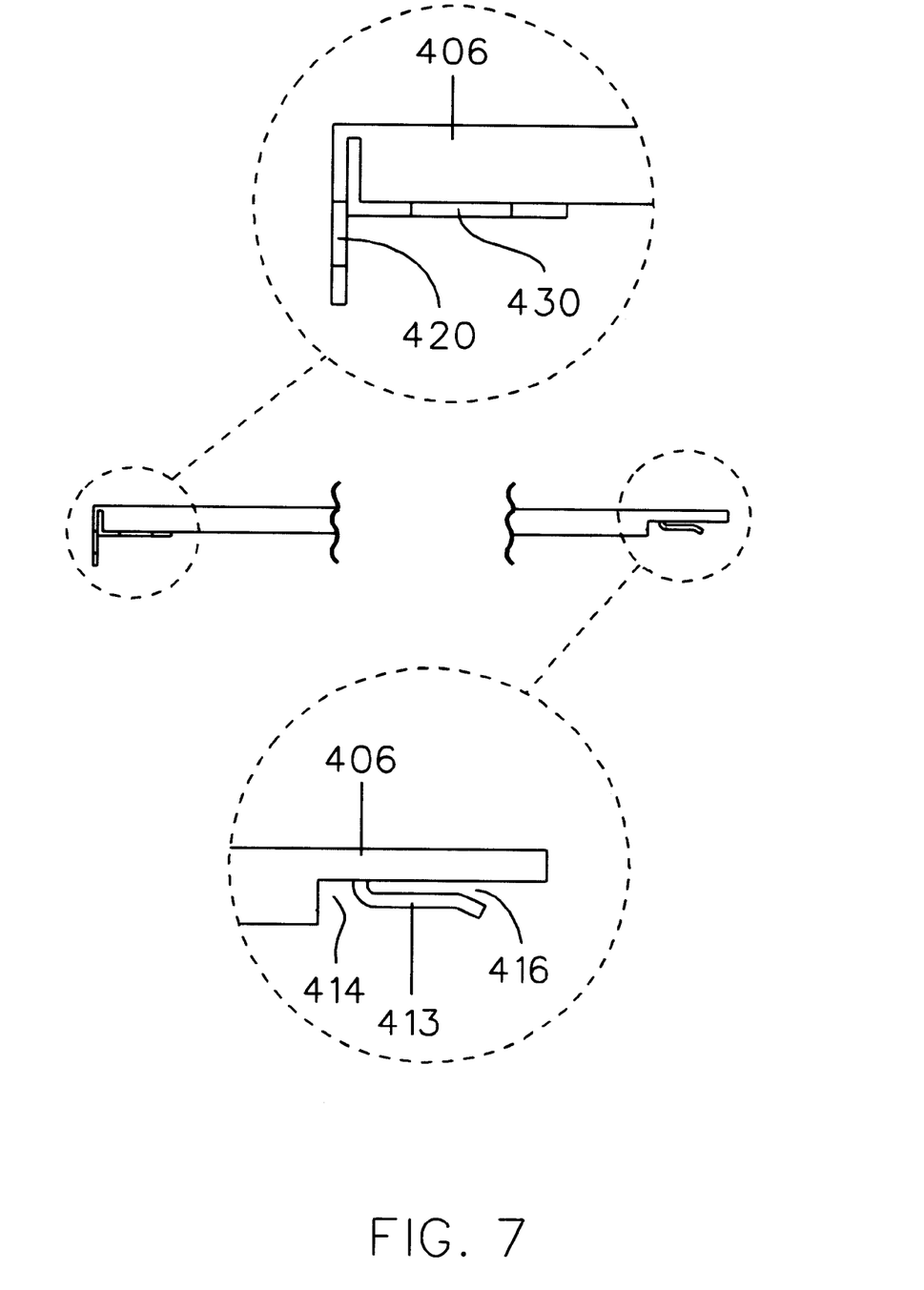
FIG. 7 is a top view of the front and rear vertical edges of the side panel shown in FIG. 6.

Turning now to FIGS. 6–7, the appliance cabinet 100 further includes right and left side panels 400. It is understood that all panel perimeter edges in this invention are inwardly formed to eliminate any sharp exterior edges. Accordingly, each side panel 400 includes top and bottom edges 402 that are inwardly molded to form L-shaped channels 404, said channels 404 extending from a back edge 410 of each side panel 400 to a notch 414 near a front edge 412. Each channel 404 comprises a horizontal first edge 406 attached to vertical second edge 408, the second edge 408 being parallel to the side panel 400. It is understood that channels 404 serve to support each side panel 400 into a desired position near first 202 and second 204 ends of the bottom panel 200 and lid 320.

Each side panel 400 further includes a front edge 412 that integrally forms a hem structure 413, said hem structure 413 vertically extending along the entire length of the front edge 412. More particularly, the hem structure 413 is formed by a front flange/edge 412 normal to the side panel, a rearwardly extending flange 412a with a parallel flange 412b attached thereto (FIG. 6). Flanges 412a, 412b cooperate to provide a generally U-shaped outwardly open slot 416 for receiving hemmed edges 606 of a front panel 600 therein as to be described later. The components of the hem structure 413 are flexible so as to receive the hemmed edge 606 therein in this friction fit engagement. The hem structures 413 and hemmed edges 606 provide an interlocking means for securing the front 600 and side panels 400 to each other.

Each side panel 400 further includes a pair of brackets 420 integrally attached to the ends 422 of the back edge 410, each bracket 420 extending perpendicular to the side panel 400. Each bracket 420 includes an aperture 421 which registers with a threaded aperture 512 in a back panel 500 for screwably securing said side 400 and back 500 panels to the support frame 102, said back panel 500 to be further described later. An inwardly molded L-shaped channel 424 is provided between the brackets 420 on the back edge 410 of each side panel 400. Each channel 424 comprises a normal first edge 426 and a second edge 428 parallel to the side panel 400. A plurality of laterally spaced apart tabs 430 integrally extend from said second edge 428 and are insertably joined to corresponding mating slots 510 in the back panel 500. In function, the tabs 430 and mating slots 510 provide an interlocking means for securing the side 400 and back 500 panels to each other. The channel 424 includes a centrally interiorly disposed recess 432 accessible to a user's finger through a corresponding recess 522 on the exterior of the back panel 500. It is understood that the side panel recess 432 enhances a user's grip on a side panel 400 during removal or insertion of said panel 400.

Figure 8:
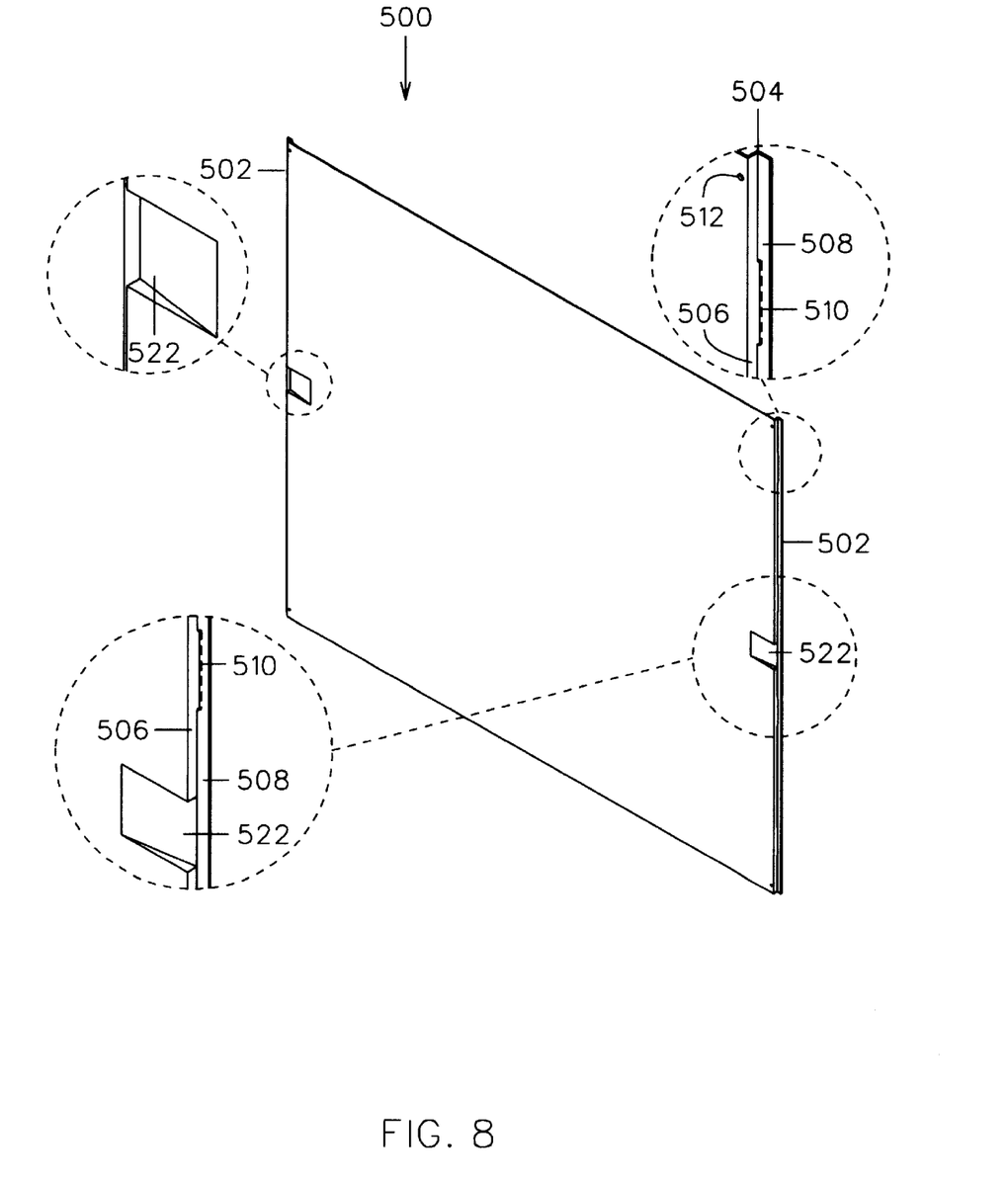
FIG. 8 is an isometric view of the back panel with enlarged isolated views of the recesses and tab slots.
Figure 9:
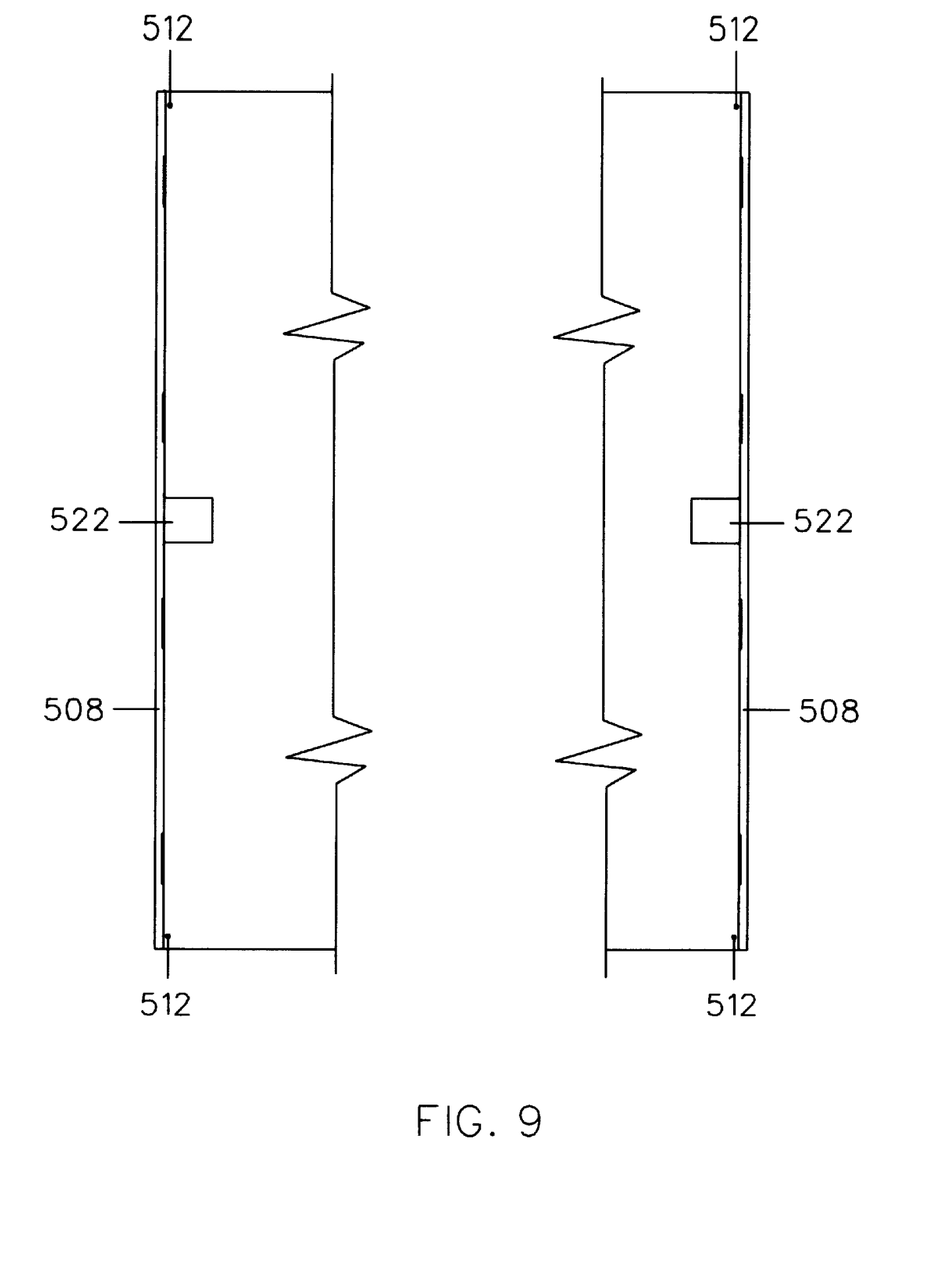
FIG. 9 is a fragmentary back view of the opposed vertical edges of the back panel shown in FIG. 8.

As particularly shown in FIGS. 8–9, a back panel 500 includes an L-shaped channel 504 vertically extending the entire length of each side 502 of said panel 500. Each channel 504 comprises a normal first edge 506 integrally attached to a second edge 508 parallel to the back panel 500. The second edge 508 of each channel 504 includes a plurality of spaced apart vertical slots 510 correspondingly positioned to insertably receive tabs 430 from each side panel 400. Likewise, threaded apertures 512 are positioned about the back panel 500 to correspond with the bracket apertures 421 on the side panels 400, screwably securing therethrough the side 400 and back 500 panels to the support frame 102. The back side 520 of the back panel 500 further includes a tapered recess 522 centrally positioned on each channel 504, said recess 522 providing access to a corresponding recess 432 in each side panel 400 as previously described.

Figure 4:
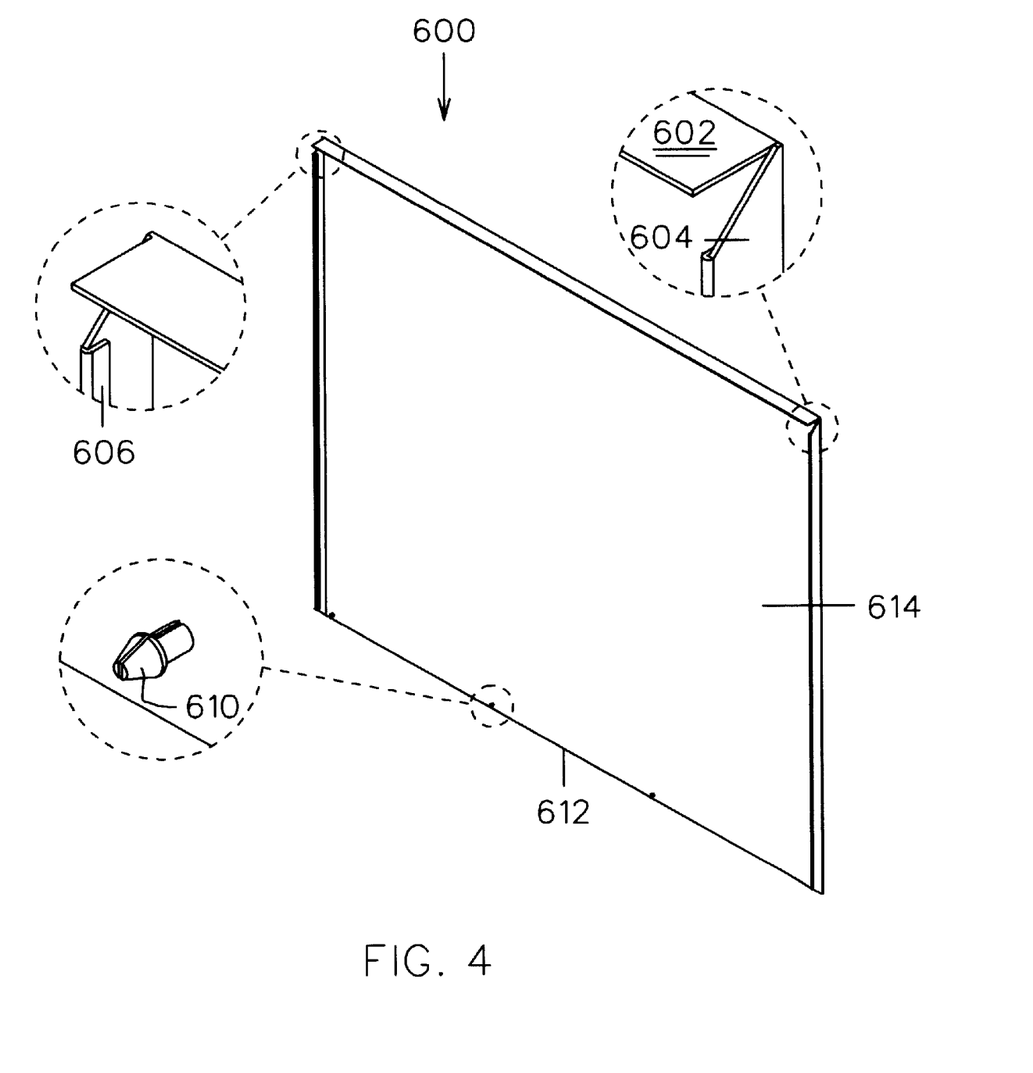
FIG. 4 is an isometric view of the front panel with enlarged isolated views of the hemmed edges and a fastener.
Figure 5:
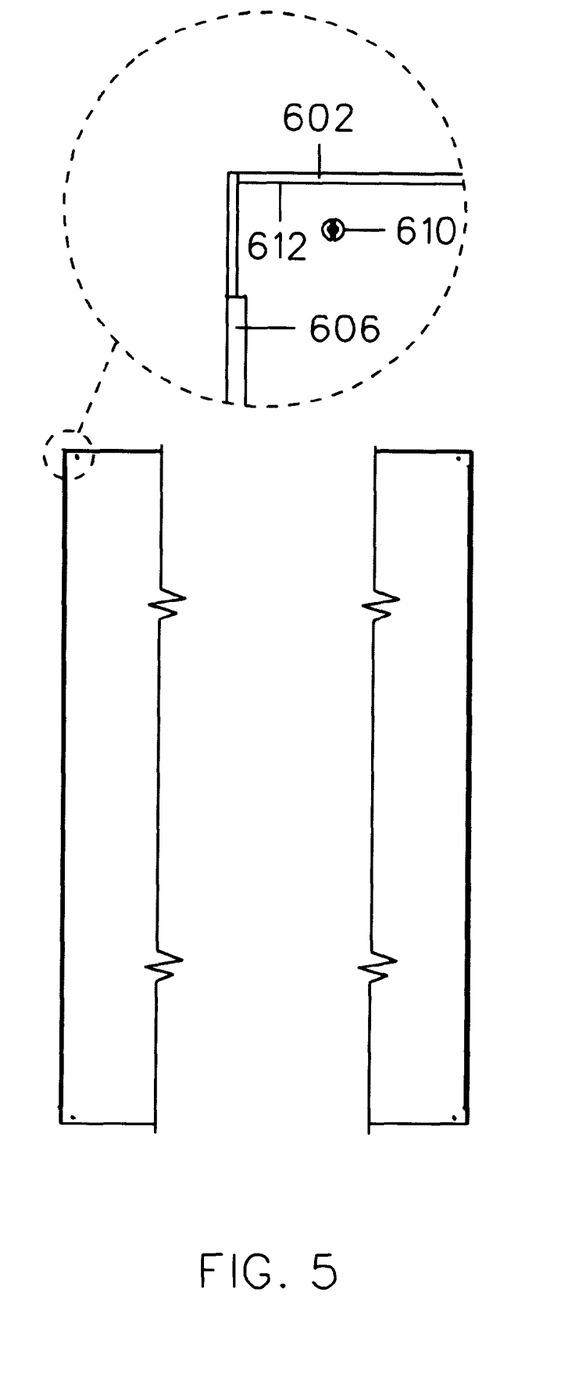
FIG. 5 is a back view of the front panel showing one placement of a fastener.

The appliance cabinet 100 further comprises a front panel 600 (FIG. 4) having a perpendicularly inwardly disposed top 602, left and right sides 604, said left and right sides 604 forming hemmed edges 606 which eliminate any sharp edges. It is understood that said hemmed edges 606 are insertably joined in a friction fit engagement therein within corresponding hem slots 416 in the side panels 400 as described earlier. The front panel 600 includes a plurality of perpendicular elongated fasteners 610 fixedly attached about the upper and lower edges 612 of the interior side 614 of the front panel 600, said fasteners 610 being releasably joined (not shown) to the support frame 102. It is understood that said fasteners 610 may be snappably insertable into the support frame 102 or alternatively, may be springably mounted.

Accordingly, it can be seen that the appliance cabinet construction provides selectively removable panels about a support frame which houses the working components of an appliance. Interlocking structures secure the panels to each other, while front and back panels are releasably secured to the support frame. It is understood that removability of the panels provides full access to the working components of the appliance for maintenance and repair of the same as well as allowing decorative substitution of panels.

It is to be understood that while a certain form of this invention has been illustrated and described, it is not limited thereto except insofar as such limitations are included in the following claims and allowable functional equivalents thereof.

Having thus described the invention, what is claimed as new and desired to be secured by Letters Patent is as follows:

1. An enclosure comprising:
  a rear panel having top and bottom edges with a pair of vertical edges spanning therebetween, each vertical edge comprising:
    a first flange normal to said rear panel and generally extending between said top and bottom edges;
    a second flange normal to said first flange and parallel to said rear panel;
    at least one slot in said second flange;
  a pair of side panels, each side panel comprising top and bottom edges with a pair of front and rear vertical edges spanning therebetween, each side panel rear vertical edge comprising:
    a first flange normal to said side panel;
    a second flange normal to said side panel first flange and parallel to said side panel;
    at least one first tab extending from said second flange of said side panel, said at least one first tab of each said side panels respectively releasably engaging said at least one slot in said second flange of each of said vertical edges of said rear panel in a one-to-one relationship therebetween;

each side panel front edge comprising:
  a first flange normal to said side panel;
  a second flange normal to said first flange and parallel to said side panel;
  a third flange connected to said second flange and parallel to said second flange to present a slot between said second and third side panel flanges;
a front panel having top and bottom edges with a pair of vertical edges spanning therebetween, each front panel vertical edge including:
  a flange releasably fitted within one of said respective slots formed along one of said respective side panel front edges;
a support frame;
a bottom panel attached to said support frame;
means for releasably attaching said front and rear panels to said frame and atop said bottom panel with each said flanges along said respective front panel vertical edges releasably fitted within a respective slot along said respective side panel front edges, said at least one first tab of said rear respective vertical edges of each of said side panels respectively releasably secured within said at least one slot along one of said respective vertical edges of said rear panel, said engaged front, rear and side panels forming a compartment;
a lid for placement atop said front, rear and side panels for releasably closing said compartment, whereby to present an enclosure with access thereto.

2. The enclosure as claimed in claim 1 further comprising:
at least one second tab normally extending from said rear vertical edge of each side panel and in the same direction as said first flange of said side panel;
an aperture in said at least one second tab;
an aperture in said rear panel along each vertical edge of said rear panel for respective registration with said aperture in said at least one second tab of each of said side panels upon said engagement of said side and rear panels forming said compartment;
a fastener releasably insertable within said registered apertures, whereby to further secure one of each of said side panels to one of said vertical edges of said rear panel.

3. The enclosure as claimed in claim 1 further comprising:
a first wall extending from said bottom panel;
a second wall extending from said first wall and cooperating with said first wall and adjacent portions of said front, rear and side panels to form an area partitioned from said compartment, said area accessible upon removal of one of said panels adjacent said formed area.

4. The enclosure as claimed in claim 3 wherein said one of said adjacent panels is one of said side panels adjacent said formed area.

5. The enclosure as claimed in claim 1 further comprising a recess along said vertical edges of said rear panel, said recess for presenting an area for a user grip therein.

6. An enclosure comprising:
a support frame;
a rear panel attached to said frame, said rear panel having top and bottom edges with a pair of vertical edges spanning therebetween;
a first interlocking element on each of said rear panel vertical edges;
a pair of side panels, each side panel comprising top and bottom edges with front and rear vertical edges spanning therebetween;
a second interlocking element on each side panel rear vertical edge, each one of said second interlocking elements complementary with one of said first interlocking elements, an engagement of said first and second elements interlocking said side panels to said rear panel and about said frame;
a third interlocking element on each side panel front vertical edge;
a front panel having top and bottom edges with a pair of vertical edges spanning therebetween;
a fourth interlocking element on each front panel vertical edge, each one of said fourth interlocking elements complementary with one of said third interlocking elements, an engagement of said third and fourth elements interlocking said side panels with said front panel;
a bottom panel adapted for attachment to said support frame and engageable with said interlocked panels to form a compartment;
a cover adapted for placement atop said interlocked panels and engageable with said interlocked panels for releasably closing said compartment.

7. The enclosure as claimed in claim 6 wherein each said first interlocking elements comprises a series of apertures along one of said rear vertical edges of said rear panel, and wherein each of said respective second interlocking elements is configured to engage a respective aperture of said series of apertures comprising each said respective first interlocking element.

8. The enclosure as claimed in claim 7 wherein each said second interlocking element comprises a series of tabs along said rear vertical edge of each side panel, a respective tab of each said second interlocking element adapted for said engagement with a respective aperture of said series of apertures of each of said respective first interlocking elements.

9. The enclosure as claimed in claim 6 wherein each said third interlocking element comprises a slot along said front vertical edge of each side panel, wherein each said respective fourth interlocking element is adapted to engage said respective slot comprising each said third interlocking element.

10. The enclosure as claimed in claim 9 wherein said slot of each said third interlocking element is presented by a pair of generally parallel flanges extending along said front vertical edge of each side panel, wherein each said fourth interlocking element is configured to fit between said flanges of a corresponding third interlocking element forming said slot.

11. The enclosure as claimed in claim 10 wherein each said fourth interlocking element comprises a flange extending along each vertical edge of said front panel, each said front panel flange insertable between said parallel flanges of each said respective third interlocking element on said front vertical edge of each side panel.

12. The enclosure as claimed in claim 6 further comprising:
a first wall extending from said bottom panel;
a second wall extending from said first wall and cooperating with adjacent portions of said front, rear and side panels to form an area partitioned from said compartment, said area accessible upon removal of one of said panels from said frame adjacent said formed area.

13. An enclosure comprising:
a first panel having top and bottom edges with a pair of vertical edges spanning therebetween;

a first interlocking element on each of said first panel vertical edges;

a pair of second and third panels, each second and third panel comprising top and bottom edges with a pair of front and rear vertical edges spanning therebetween;

a second interlocking element on each of said second and third panel rear vertical edges said respective second interlocking elements complementary with said respective first interlocking elements, an engagement of said first and second elements interlocking said second and third panels to said first panel;

a third interlocking element on each of said second and third panel front edges, each said third interlocking element comprising a slot presented between a pair of flanges extending along said front vertical edge of each of said second and third panels;

a fourth panel having top and bottom edges with a pair of vertical edges spanning therebetween;

a fourth interlocking element on each fourth panel vertical edge, each said fourth interlocking element respectively insertable within said slot of each said third interlocking elements, an engagement of said third and fourth elements interlocking said second and third panels with said fourth panel;

a fifth panel engageable with said interlocked panels whereby to form an open compartment.

14. The enclosure as claimed in claim 13 further comprising a sixth panel for connection with said interlocked panels for releasably closing said compartment.

15. The enclosure as claimed in claim 14 further comprising a seventh panel releasably engageable with said sixth panel.

16. The enclosure as claimed in claim 13 wherein each said first interlocking element comprises a series of apertures along said vertical edges of said first panel, each of said second interlocking elements configured to engage a respective aperture of said series of apertures of a respective first interlocking element.

17. The enclosure as claimed in claim 16 wherein each said second interlocking element comprises a series of tabs along said rear vertical edge of each second and third panels for engagement with each respective aperture of said series of apertures of said respective first interlocking element.

* * * * *